US012524247B2

(12) United States Patent
Singh

(10) Patent No.: US 12,524,247 B2
(45) Date of Patent: Jan. 13, 2026

(54) COMPUTING SYSTEM AND METHODS FOR PRELAUNCHING APPS IN VIRTUAL COMPUTING SESSIONS

(71) Applicant: CITRIX SYSTEMS, INC., Fort Lauderdale, FL (US)

(72) Inventor: Manbinder Pal Singh, Coral Springs, FL (US)

(*) Notice: Subject to any disclaimer, the term of this patent is extended or adjusted under 35 U.S.C. 154(b) by 741 days.

(21) Appl. No.: 17/661,931

(22) Filed: May 4, 2022

(65) Prior Publication Data
US 2023/0359467 A1  Nov. 9, 2023

(51) Int. Cl.
G06F 9/44 (2018.01)
G06F 9/445 (2018.01)
G06F 9/451 (2018.01)
H04L 67/141 (2022.01)

(52) U.S. Cl.
CPC .............. *G06F 9/445* (2013.01); *G06F 9/452* (2018.02); *H04L 67/141* (2013.01)

(58) Field of Classification Search
CPC ........................................................ G06F 9/445
USPC ......................................................... 718/100
See application file for complete search history.

(56) References Cited

U.S. PATENT DOCUMENTS

| | | | |
|---|---|---|---|
| 9,189,252 B2 * | 11/2015 | Chu | G06F 9/451 |
| 10,261,938 B1 * | 4/2019 | Jenkins | G06F 16/9574 |
| 11,128,676 B2 | 9/2021 | Momchilov et al. | |
| 2010/0325278 A1 * | 12/2010 | Heim | G06F 9/45558 |
| | | | 709/227 |
| 2013/0263123 A1 * | 10/2013 | Zhou | G06F 9/445 |
| | | | 718/1 |
| 2014/0372356 A1 * | 12/2014 | Bilal | G06N 5/02 |
| | | | 706/46 |
| 2014/0373032 A1 * | 12/2014 | Merry | G06F 9/54 |
| | | | 719/328 |
| 2018/0239624 A1 * | 8/2018 | Tsirkin | G06F 9/445 |
| 2019/0018719 A1 * | 1/2019 | Brin | G06F 9/547 |
| 2019/0102211 A1 * | 4/2019 | Root | H04W 4/021 |

* cited by examiner

*Primary Examiner* — Timothy A Mudrick

(57) ABSTRACT

A computing system includes a client computing device to display items in an application window, with at least one of the items having a file attachment that has not been opened by a user of the client computing device. A session broker in communications with the client computing device transmits a prelaunch application message to initiate prelaunch of an application that can be used to open the file attachment. A virtual server in communications with the session broker and the client computing device prelaunches in a virtual session the application that can be used to open the file attachment in response to receiving the prelaunch application message, and hides display of the prelaunched application until the user opens the file attachment.

23 Claims, 12 Drawing Sheets

COMPUTING SYSTEM AND METHODS FOR PRELAUNCHING APPS IN VIRTUAL COMPUTING SESSIONS

TECHNICAL FIELD

The present disclosure relates to computing systems, and more particularly, to remote applications being prelaunched in virtual computing sessions to improve user launch experience.

BACKGROUND

Many organizations are now using application and/or desktop virtualization to provide a more flexible option to address the varying needs of their users. In desktop virtualization, a user's operating system, applications, and/or user settings may be separated from the user's physical smartphone, laptop, or desktop computer.

Using client-server technology, a virtualized desktop may be stored in and administered by a remote server, rather than in the local storage of a computing device. The computing device accesses the virtualized desktop in a remote computing session with the server. The remote computing session allows a user to access resources. The resources, for example, include SaaS and web apps, desktops, files and data.

SUMMARY

A computing system includes a client computing device to display items in an application window, with at least one of the items having a file attachment that has not been opened by a user of the client computing device. A session broker in communications with the client computing device transmits a prelaunch application message to initiate prelaunch of an application that can be used to open the file attachment. A virtual server in communications with the session broker and the client computing device prelaunches in a virtual session the application that can be used to open the file attachment in response to receiving the prelaunch application message, and hides display of the prelaunched application until the user opens the file attachment.

In response to the user not opening the file attachment within a set time period, the virtual server may close the prelaunched application.

The client computing device launches an application providing the application window, and wherein the application may be an email application or a messaging application, and the items being displayed are emails or messages.

The virtual session with the prelaunched application may be an established virtual session already being accessed by the client computing device.

The virtual session with the prelaunched application may be a prelaunch session that is not being accessed by the client computing device.

The prelaunch session may be an anonymous prelaunch session that is not assigned to the user but will be assigned to the user in response to the user opening the file attachment, and if the user does not open the file attachment, then the anonymous prelaunch session is assigned to a different user of another client computing device.

The client computing device may be further configured to monitor unread items for file attachments, identify the file attachment that has not been opened by the user for one of the unread items, and determine a file type of the identified file attachment.

The determining the file type may be based on at least one of a name of the file attachment, a file extension of the file attachment, and an icon representing the file attachment.

The determining may be performed by analyzing a document object model (DOM) tree of the file attachment, monitoring user interface (UI) elements displayed in the application window, or analyzing the displayed application window using computer vision.

The client computing device may further transmit the determined file type to the session broker, and wherein the session broker may determine which application is to be prelaunched based on the determined file type.

The client computing device may further determine what application is needed to open the file attachment based on the determined file type, and transmits the determined application to the session broker to be prelaunched.

The client computing device may launch an application providing the application window, and wherein the application is configured to perform the monitoring, identifying and determining.

The client computing device may include a local browser to launch a web-based application providing the application window, and wherein the local browser may be configured to perform the monitoring, identifying and determining.

Another aspect is directed to a method of operating the computing system as described above. The method includes displaying items in an application window on a client computing device, with at least one of the items having a file attachment that has not been opened by a user of the client computing device. The method further includes operating a session broker in communications with the client computing device to transmit a prelaunch application message to initiate prelaunch of an application that can be used to open the file attachment. A virtual server in communications with the session broker and the client computing device is operated to prelaunch in a virtual session the application that can be used to open the file attachment in response to receiving the prelaunch application message, and hide display of the prelaunched application until the user opens the file attachment.

Yet another aspect is directed to a virtual server that includes a processor receiving a prelaunch application message from a session broker to initiate prelaunch of an application that can be used to open a file attachment displayed in an application window on a client computing device. The processor prelaunches in a virtual session the application that can be used to open the file attachment in response to receiving the prelaunch application message, and hides display of the prelaunched application until a user of the client computing device opens the file attachment.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Figure 1:
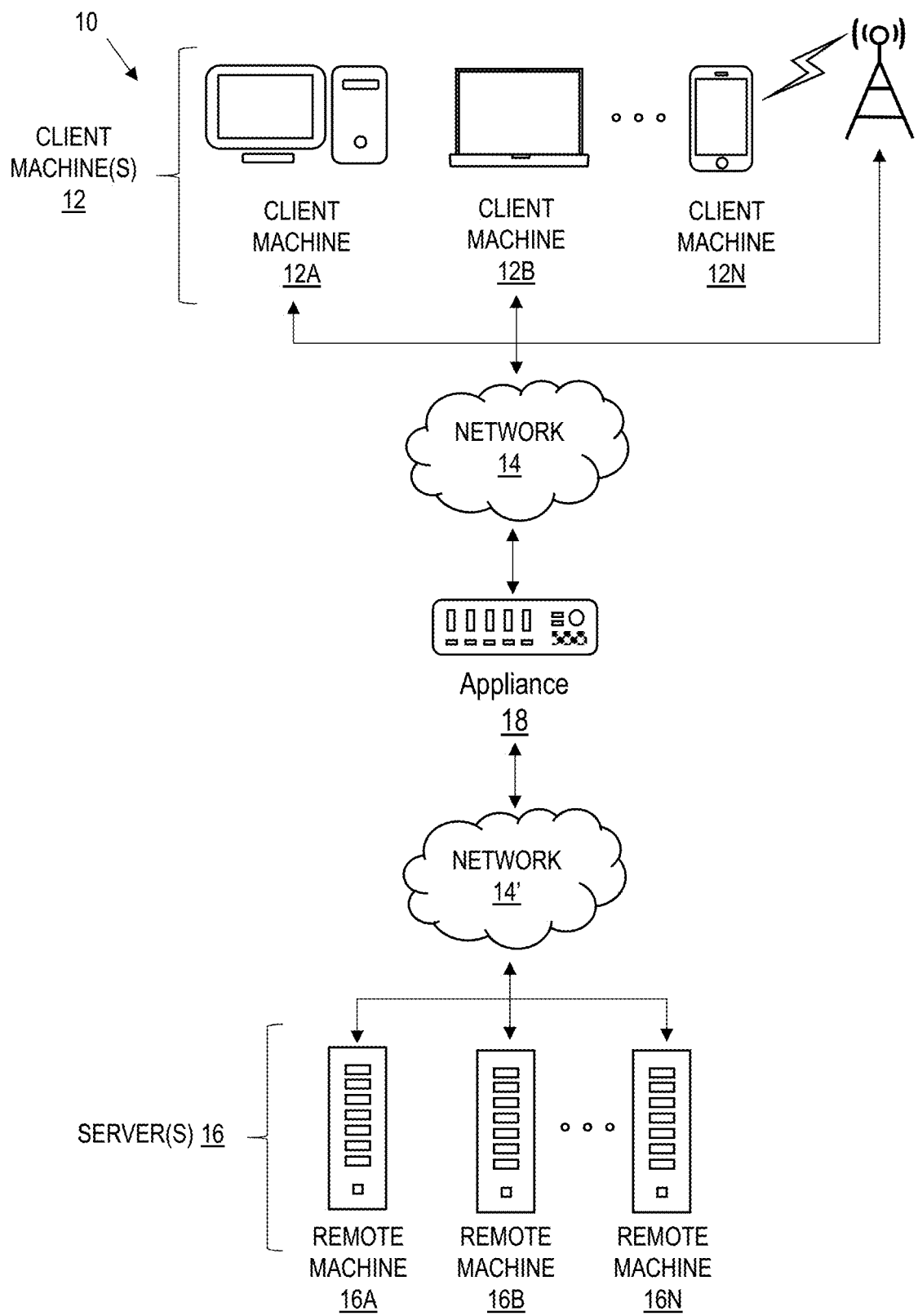
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'. In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 18 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
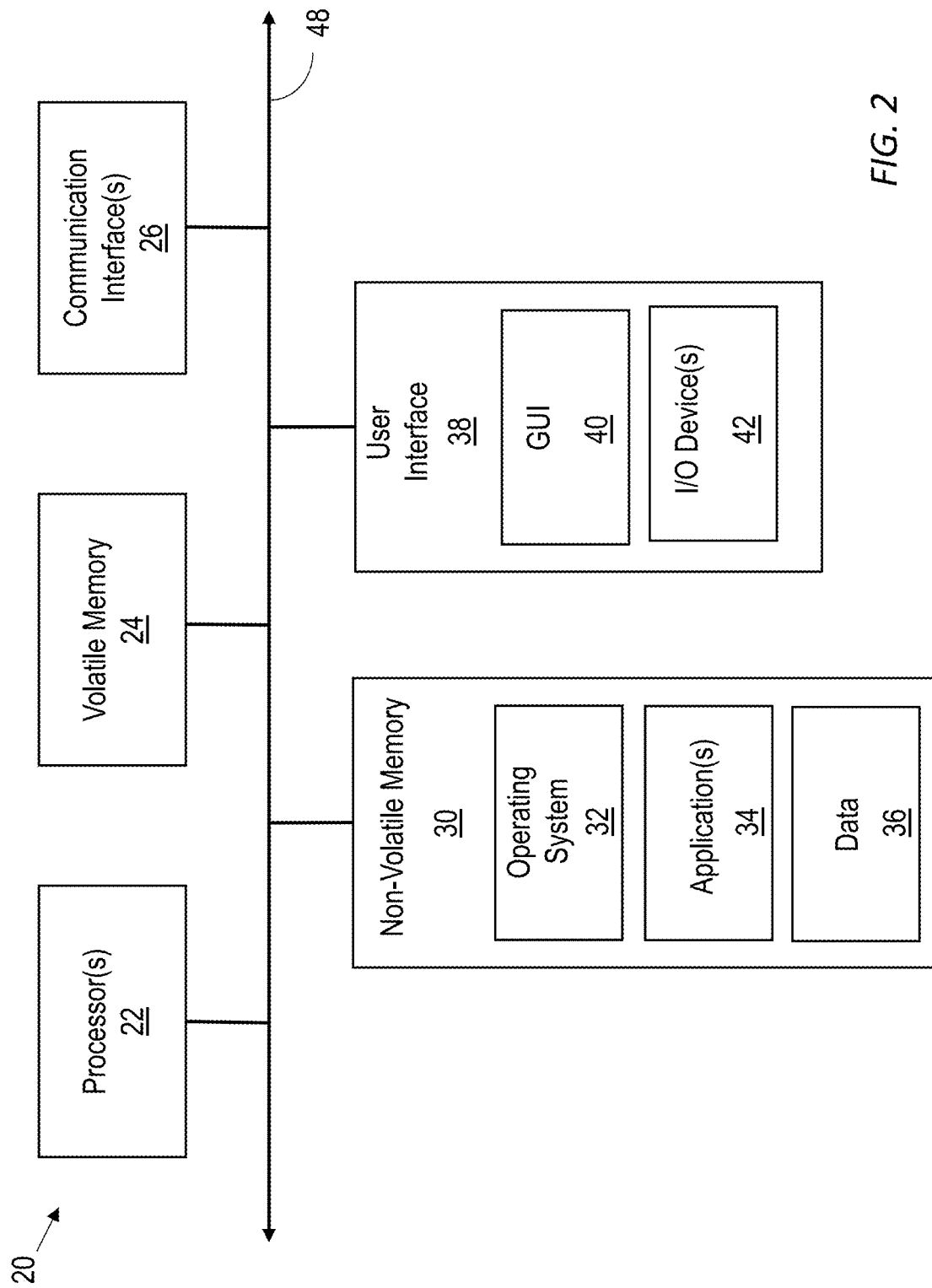
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Florida ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
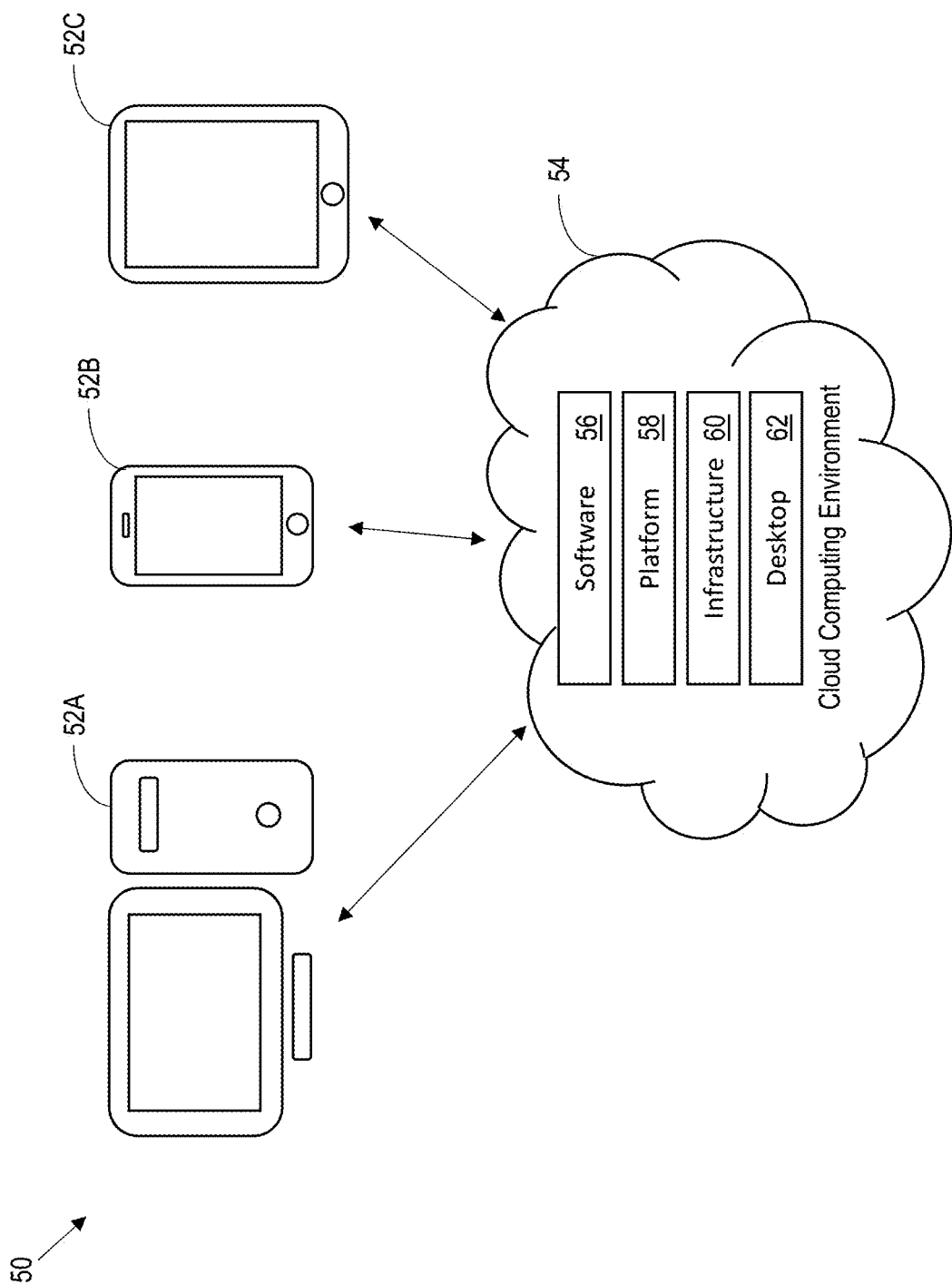
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft ONEDRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Washington (herein "Azure"), or AMAZON WEB SERVICES provided by Amazon.com, Inc., of Seattle, Washington (herein "AWS"), for example. In the case of Citrix Cloud, Citrix Workspace app may be used as a single-entry point for bringing apps, files and desktops together (whether on-premises or in the cloud) to deliver a unified experience.

Figure 4:
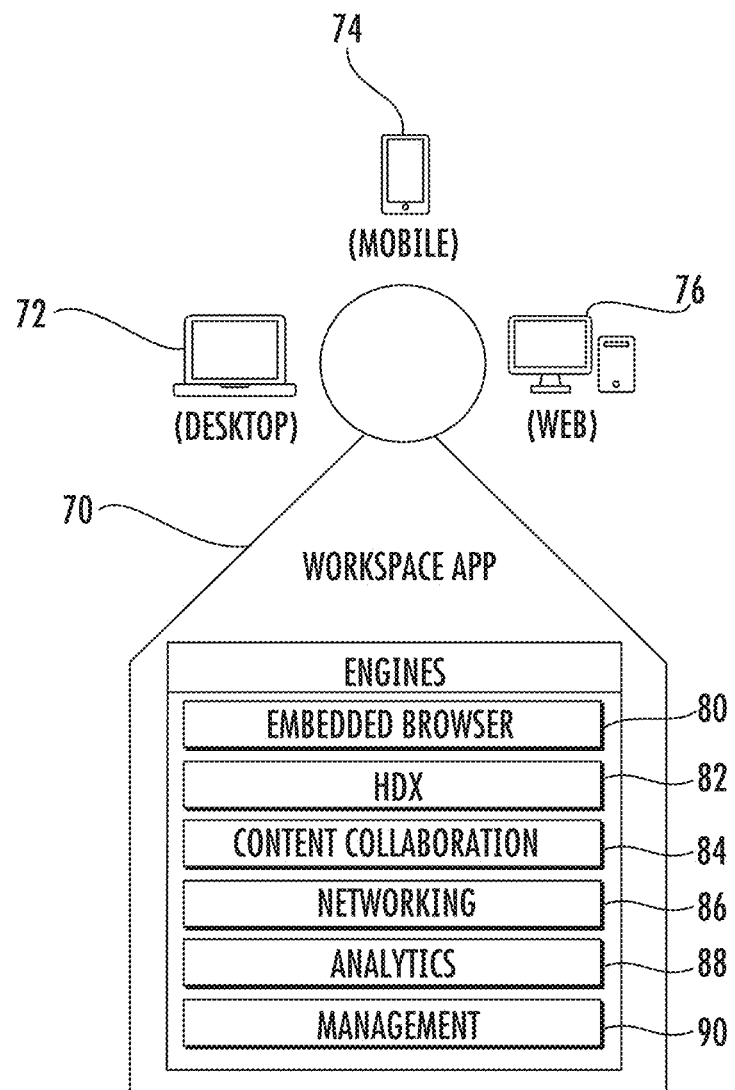
FIG. 4 is a schematic block diagram of desktop, mobile and web based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific p-VPN connection. A p-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
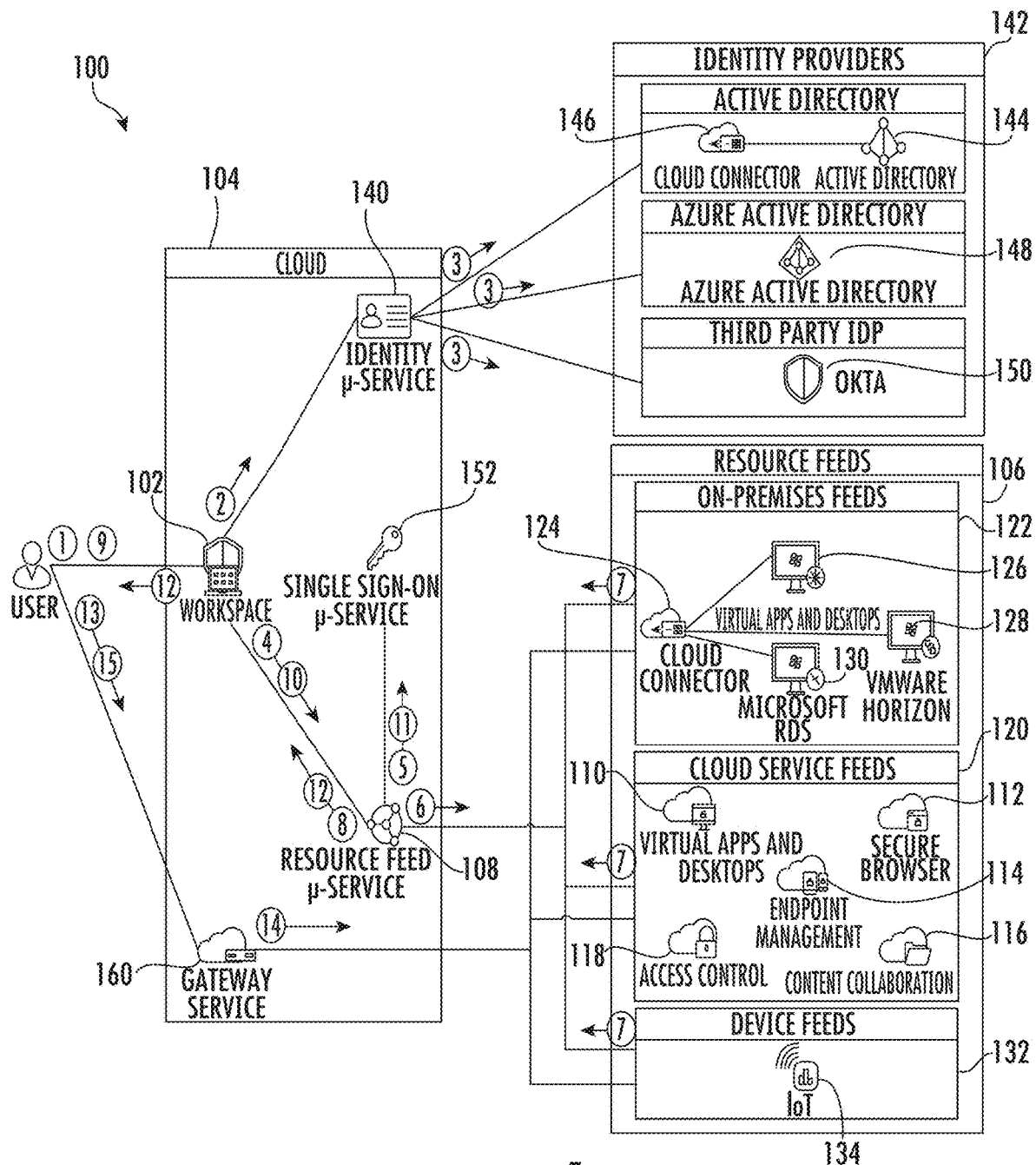
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Citrix Cloud 104. The workspace experience service 102 then pulls in all the different resource feeds via a resource feed micro-service 108. That is, all the different resources from other services running in the Citrix Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Citrix Cloud 104, and presenting their identity (event 1). The identity includes a user name and password, for example.

The workspace experience service 102 forwards the user's identity to an identity micro-service 140 within the Citrix Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Citrix Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15). Having an entire workspace delivered through a single access point or application advantageously improves productivity and streamlines common workflows for the user.

Figure 6:
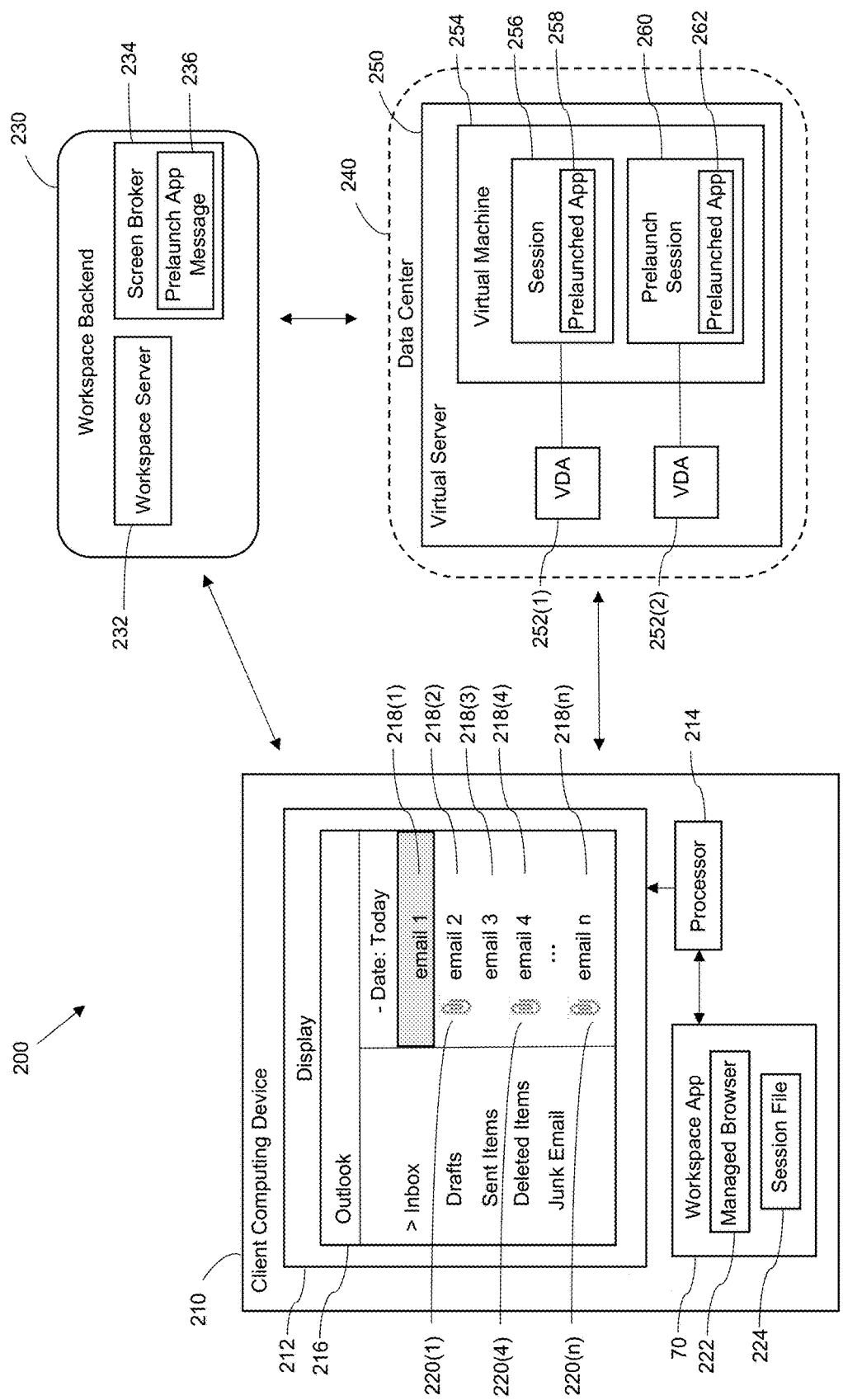
FIG. 6 is a schematic block diagram of a computing system that prelaunches applications in a virtual computing session based on prediction of file attachments to be opened according to aspects of the disclosure.

Referring now to FIG. 6, the illustrated computing system 200 prelaunches remote applications 258, 262 in virtual sessions 256, 260 in a virtual server 250 based on predicting or identifying file attachments 220(1), 220(4) and 220(n) to be opened by a user of a client computing device 210. File attachments 220(1), 220(4) and 220(n) may be generally referred to as file attachments 220. The prelaunched applications 258, 262 can be used to open the file attachments 220 in the virtual session 256, 260 should the user decide to open the file attachments.

As will be discussed in detail below, the prelaunched applications 258, 262 are not displayed to the user until the user actually opens the file attachments 220. In response to the user opening one of the file attachments 220, the corresponding prelaunched application 258 or 262 provides a better user experience with an improved launch performance. Alternatively, if the user does not open one of the predicted file attachments 220 within a set time period, for example, then the corresponding prelaunched application 258 or 262 is closed to free up resources in the virtual server 250.

The computing system 200 includes at least one client computing device 210, a workspace backend 230 and the virtual server 250. The workspace backend 230 includes a workspace server 232 that authorizes a user of the client computing device 210 to access published resources. When a published resource is to be accessed, the workspace server 232 coordinates with a session broker 234. The session broker 234 communications with the virtual server 250 to establish a session 256, and create a session file 224 for the client computing device 210 that is used to connect to the assigned session 256.

The session broker 234 also communications with the virtual server 250 by providing a prelaunch application message 236 to establish one or more prelaunch sessions 260 at the virtual server 250. Initially, the prelaunch session 260 is not being accessed by the client computing device 210 as is the case with session 256. The prelaunch session 260 allows for a prelaunched application 262 to be within the prelaunch session 260. In response to the user opening an attachment 220 supported by the prelaunched application 262, then a session file 224 is provided to the client computing device 210 that is used to access the prelaunched application 262 in the prelaunch session 260. At this point, the prelaunch session 260 is operating as an assigned session similar to session 256.

In greater detail, access to the virtual computing sessions 256, 260 at the virtual server 250, for example, may be provided using Citrix Virtual Apps and Desktops (CVAD) from Citrix Systems, Inc. Citrix Virtual Apps is an application virtualization solution that helps optimize productivity with universal access to remote virtual apps and server-based desktops from different client devices. Such computer virtualization infrastructures may traditionally utilize an Independent Computing Architecture (ICA) protocol and ICA files for authenticating the client computing device 210 to access the virtual computing sessions 256, 260 and computing resources (e.g., SaaS and web apps) to which the user is entitled.

Equivalent protocols and files may be used to provide access by the client computing device 210 to access virtual computing sessions 256, 260 and computing resources. For example, the ICA file may be generally referred to as a session file 224 and a corresponding ICA session may be generally referred to as a session 256. The prelaunch session 260 also has a session file (e.g., an ICA file) that is provided to the client computing device to access the prelaunch session 260.

ICA is a protocol designed for transmitting Windows graphical display data as well as user input over a network. ICA files contain short-lived Secure Ticket Authority (STA) and logon tickets. The STA ticket may be used to authorize a connection to a virtual delivery appliance (VDA) 252(1), 252(2) (e.g., Citrix Virtual Delivery Agent) via a gateway (e.g., Citrix Gateway) or via a gateway service (e.g., Citrix Gateway Service). The VDAs 252(1), 252(2) may be generally referred to as VDA 252. The logon ticket may single-sign-on (SSOn) the user into the virtual computing session.

The virtual server 250 typically operates within a data center 240. Even though only one virtual machine 254 is illustrated, the virtual server 250 includes a plurality of virtual machines running in the virtual server 250 supporting multiple users within an enterprise or organization.

The virtual delivery appliances 252(1), 252(2) are associated with the virtual machine 254. The virtual delivery appliances 252(1), 252(2) are software installed on the virtual machine 254. In the illustrative embodiment, the virtual delivery appliance 252(1) is assigned to session 256, and the virtual delivery appliance 252(2) is assigned to the prelaunch session 260.

Although not shown, the virtual server 250 typically has a pool of virtual delivery appliances 252 that are set aside to provide prelaunch sessions 260 before they are actually needed. This helps speed up the process for when applications are to be prelaunched by already having the prelaunch sessions running.

The pool of virtual delivery appliances 252 may be in one or multiple virtual machines 254. For example, one of the virtual delivery appliances 252 may be used to prelaunch applications that require a high level of processing resources within a virtual machine 254, such as those needed to support AutoCAD developed by Autodesk. Another one of the virtual delivery appliances 252 may be used to prelaunch Word and Adobe applications, for example, which require a lower level of processing resources within the virtual machine 254.

Still referring to FIG. 6, the application window 216 is for an email application, such as Microsoft Outlook. In this example, the application window 216 displays emails 218(1)-218(n), which may be generally referred to as emails 218. Some of the emails 218 have file attachments 220. In different implementations, the email application can be either a virtualized application itself or it may be a web outlook application opened in a browser on the client computing device 210.

Other applications, including messaging apps and certain SaaS apps, such as Salseforce, may also have file attachments displayed in their respective application windows. In the messaging apps, messages with file attachments are displayed. In the certain SaaS apps, entries with file attachments are displayed.

For discussion purposes, email applications, messaging applications, as well as SaaS applications, may all be generally referred to as applications. Similarly, emails, messages and entries with file attachments in the respective application windows may be generally referred to as items with attachments.

Opening attachments 220 using remote applications generally provide a slow launch experience to the user of the client computing device 210. For example, opening an AutoCAD file attachment can take about 45-60 seconds to first launch the remote AutoCAD application and then open the AutoCAD file attachment 216. AutoCAD requires intensive processing resources used to create precise 2D and 3D drawings and models. Remote applications using less intensive processing resources generally take a few seconds to launch. These applications, for example, include those supported by Microsoft 365 products, such as Word, PowerPoint and Excel. Keeping these remote applications running also consumes memory resources on the virtual server 250, thereby impacting efficient utilization of sessions/resources.

The launch experience is made even slower when a session (e.g., ICA session) 256 and a session file (e.g., ICA file) 224 need to be established between the client computing device 210 and the virtual server 250 before a remote application can even be launched. For example, the client computing device 210 is not connected to the virtual server 250 since the email application providing the application window 216 may be launched using a local managed browser 222 on the client computing device 210.

Once the email application is launched, then certain applications may need to be prelaunched to support the file attachments 220 that may be opened by the user of the client computing device 210. This requires a prelaunch session 260 to initially be established with the prelaunched application 262. In response to the user opening the predicted file attachment 220 supported by the prelaunched application 262, then the prelaunch session 260 becomes a session 256 since this type of session is required for the client computing device to access the prelaunched application 262 for the first time.

Alternatively, if the email application was a published application, then the workspace backend 230 would establish a session 256 and session file 224 between the client computing device 210 and the virtual server 250 in order to launch the email application. An application may be prelaunched in the session 256, such as prelaunched application 258, or may be prelaunched in the prelaunch session 260, such as prelaunched application 262.

Figure 7:
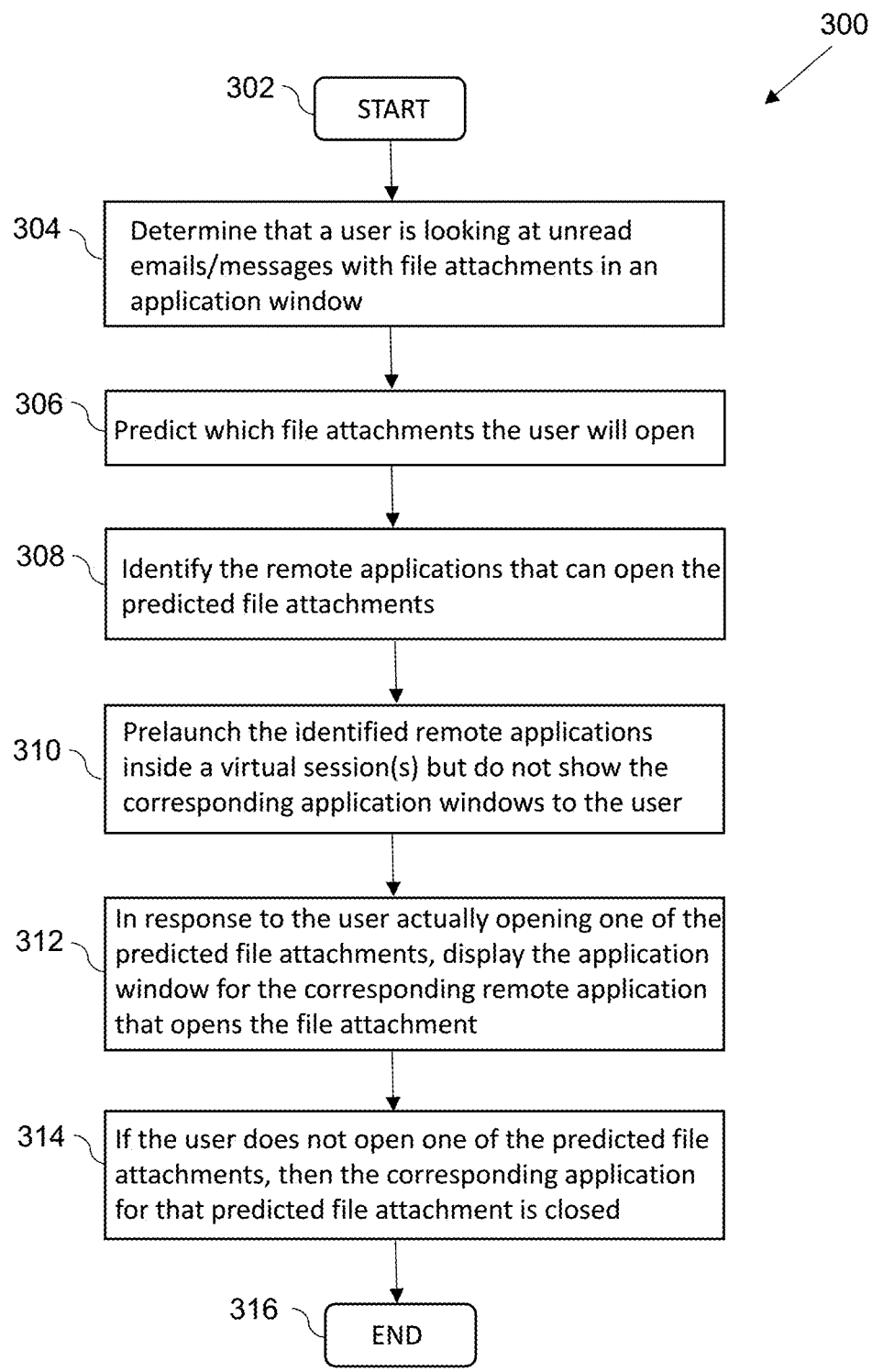
FIG. 7 is a high level flow diagram on operating the computing system illustrated in FIG. 6.

Referring now to FIG. 7, a flow diagram 300 for operating the computing system 200 will be discussed. From the start (Block 302), a determination is made at Block 304 that a user is looking at unread email/messages 218 with file attachments 220 in an application window 216. This determination may be based on the user selecting an email within the inbox to read. This initializes the monitoring for file attachments 220 for the unread emails since the user is actively looking through their emails 218.

A prediction is made at Block 306 on which file attachments 220 the user will open. In one embodiment, each file attachment 220 is predicted to be opened. In another embodiment, the file attachments 218 for the unread emails 220 marked as high priority or as originating from the user's supervisor are predicted to be opened. Other indications may be used to predict the file attachments to be opened by the user. For example, if the user's calendar indicates that the user will soon be attending a meeting, then based on user behavior in the past, certain applications may be pre-launched in anticipation of file attachments to be opened by the user in the meeting.

The remote applications that can open the predicted file attachments 220 are identified at Block 308. This is based on determining the file type of the file attachment 220. Determining the file type may be based on a name of the file attachment 220, a file extension of the file attachment 220, or an icon representing the file attachment 220. This determination may be performed by analyzing a document object model (DOM) tree of the file attachment 220, monitoring user interface (UI) elements displayed in the application window 216, and analyzing the displayed application window 216 using computer vision.

The identified remote applications are prelaunched at Block 310 in a virtual session 256, 260 in response to receiving a prelaunch application message 236 from the session broker 234. However, the corresponding application windows 216 are not shown to the user.

If there are multiple attachments of different types, it may prelaunch multiple applications. The order in which it will launch the prelaunch applications may be done in many ways. One example is to prelaunch an app for the first attachment first, and then the second attachment and so on. Another example is the user getting a .docx file and pdf file as an attachment in a single email. In other implementations the first application might be the one that takes the longest to launch, or in some implementations the first application may be the most common application user by the user. A user may be able to configure these preferences in the workspace app 70.

The virtual session with the prelaunched application 258 may be an established session 256 already being accessed by the client computing device 210. Alternatively, the virtual session with the prelaunched application 262 may be a prelaunch session 260 that is not being accessed by the client computing device 210. The prelaunch session 260 may be an anonymous prelaunch session that is not assigned to the user but will be assigned to the user in response to the user opening the file attachment 220. If the user does not open the file attachment 220, then the anonymous prelaunch session is assigned to a different user of another client computing device.

In response to the user actually opening one of the predicted file attachments 220, the application window 216 for the corresponding remote application that opens the predicted file attachment is displayed at Block 312. If the user does not open one of the predicted file attachments 220, then the corresponding prelaunched application 258 or 262 for that predicted file attachment 220 is closed at Block 314.

If the user does not open a file attachment 220 within a set period of time (e.g., 10 minutes), then the prelaunched application for that file attachment is closed. As another example, the user is sequentially going through their emails within the inbox, and the user skips an email with a file attachment having a prelaunched application associated therewith. The prelaunched application is closed unless a file attachment lower down in the stack requires the same prelaunched application. The method ends at Block 316.

Figure 8A:
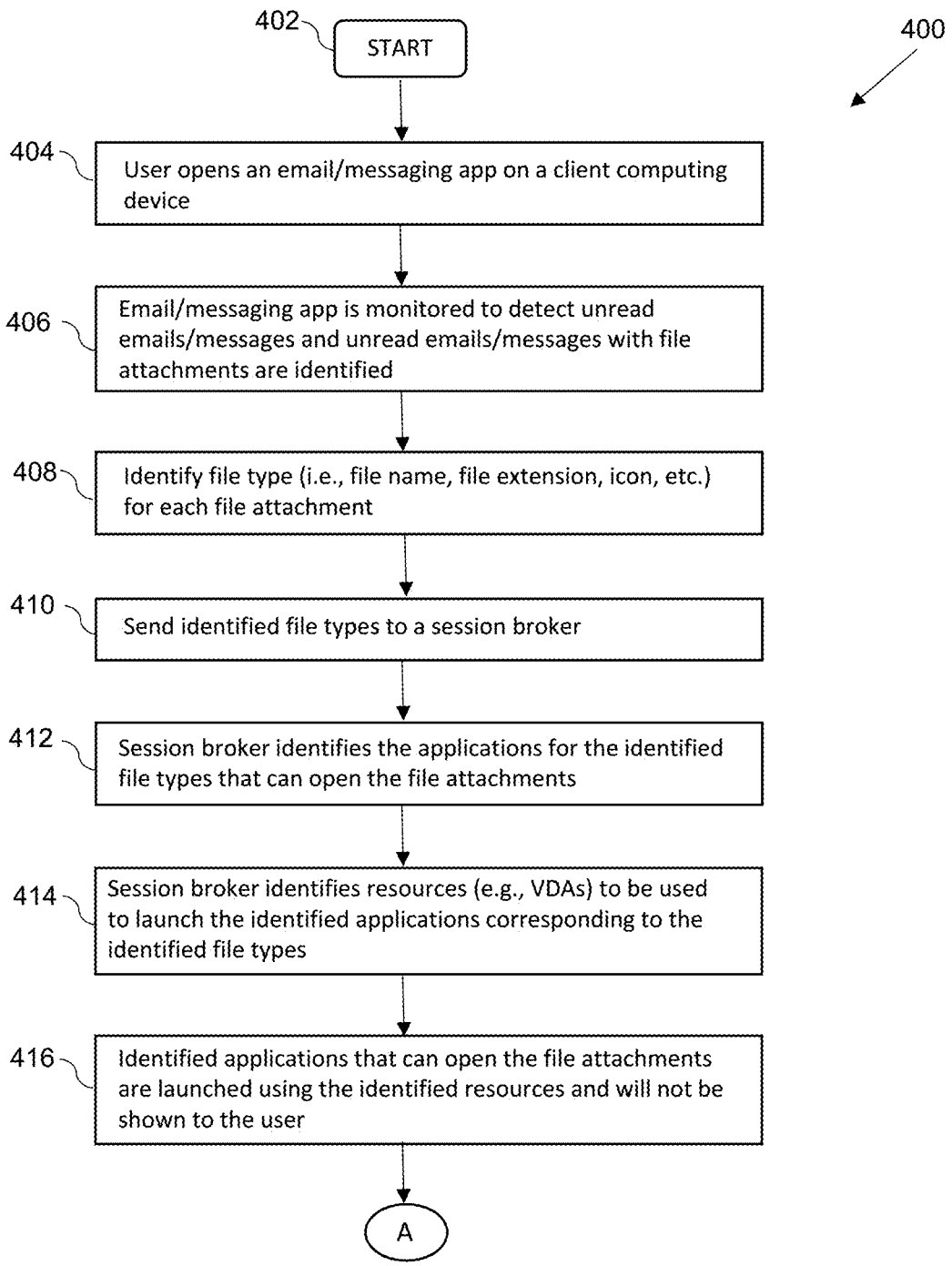
FIGS. 8A, 8B is a detailed flow diagram on operating the computing system illustrated in FIG. 6.
Figure 8B:
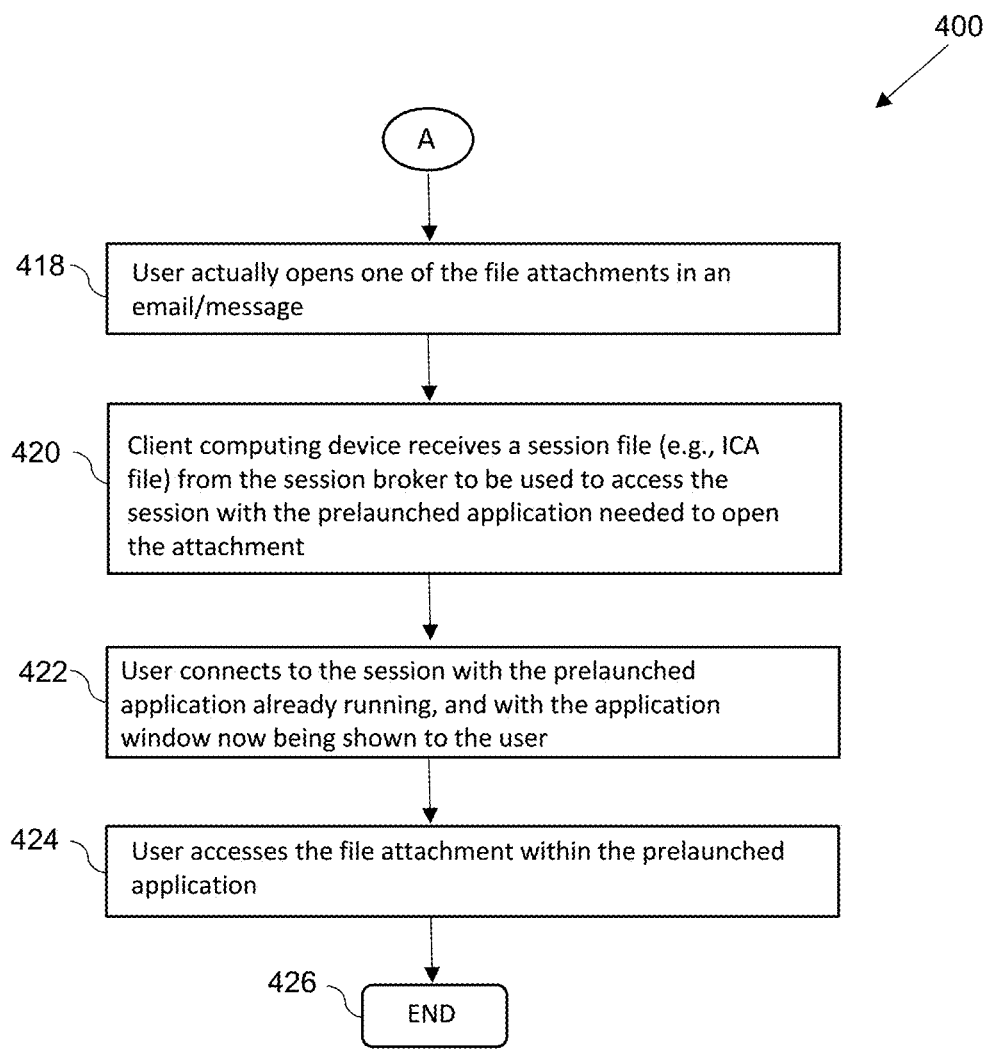
Figure 9:
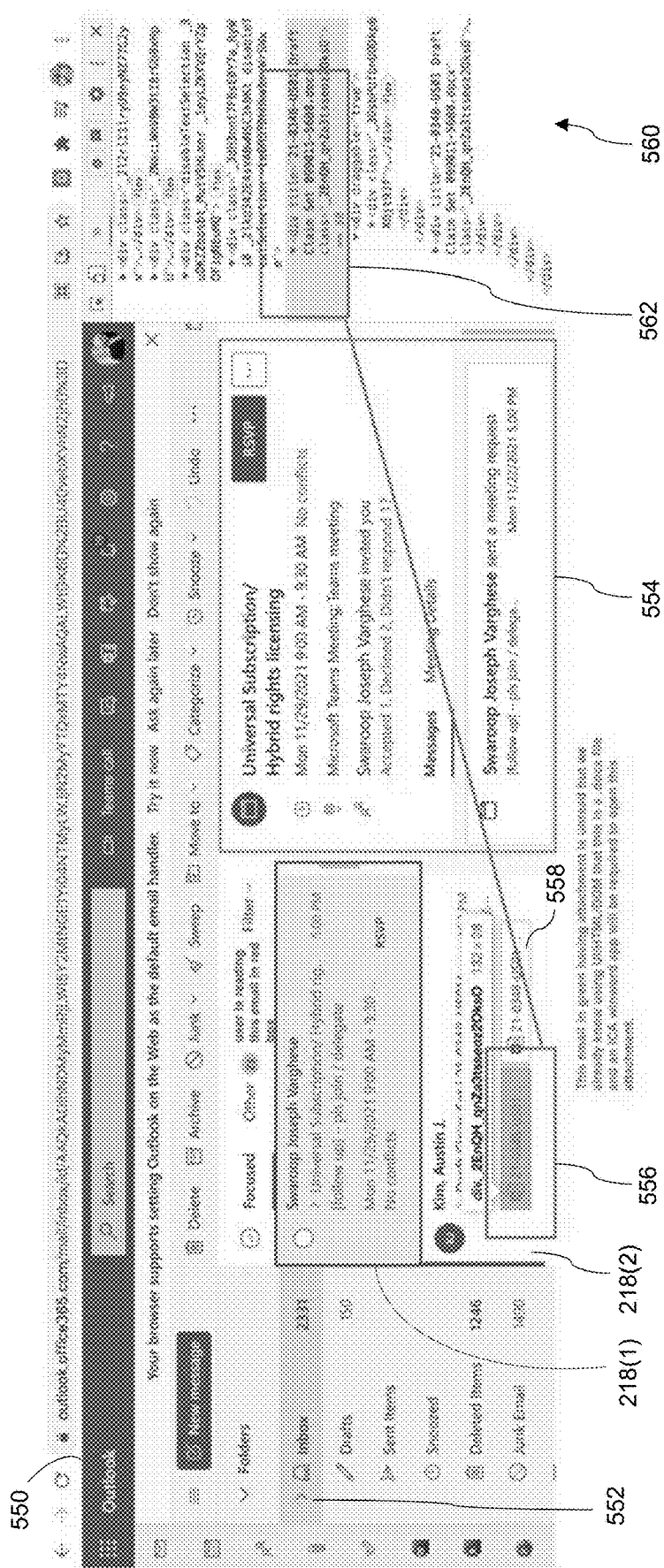
FIG. 9 is a screenshot of a web-based email application with document object model (DOM) being used to identify file attachment types within emails for the computing system illustrated in FIG. 6.

Referring now to FIGS. 8A, 8B, a more detailed flow diagram 400 on operating the computing system 200 will be discussed. From the start (Block 402c), a user of the client computing device 210 opens an email/messaging app at Block 404. A screenshot 550 of the opened web-based email application (e.g., a web-based Outlook) is provided in FIG. 9.

In the screenshot 550, the user selects the email 218(1) to read. Contents of the selected email 218(1) are shown in rectangle 554. The unread emails are detected and the unread emails with attachments are identified at Block 406. In this example, the email 218(2) below the email 218(1) is next in the inbox 552 that has not been read yet. The email 218(2) includes a pair of attachments 556, 558.

In one embodiment, detecting unread emails with attachments may be performed within the email application itself. This requires the owner of the email application to provide a plug-in or add-in to perform the monitoring and analysis. The inbox 552 indicates how many emails have been received for the user. The received emails are typically ranked in order based on when they were received, with the most recent email being at the top of the inbox 552.

In response to the user selecting email 218(1) for reading, the email application starts to monitor for unread emails with attachments 220. The monitoring is performed on unread emails 218(2) that are visible, and those emails that are not visible. For each unread email with an attachment 220, the email application plug-in identifies a file type for the attachment 220. The file type identification may be determined based on the file name, file extension or icon associated with the file attachment 220.

In another embodiment, detecting unread emails with attachments may be performed external the email application. This monitoring and analysis may be performed at the location where the email application is opened. The email application may be opened on the client computing device 210 using a local browser, such as managed browser 222. Alternatively, the email application may be opened within a browser running in a remote virtual desktop.

Identification of the file types for the attachments 220 is performed at Block 408. In the case where the email application is web-based and is accessed by a local bowser on the client computing device 210, the local browser is configured to monitor and analyze unread emails with attachments using a program interface referred to as document object model (DOM). The DOM is a programming interface for web documents that treats an XML or HTML document as a tree structure, wherein each node is an object representing a part of the document. The DOM tree 560 is not visible to the user.

Email attachment 556 is represented by box 562 within the DOM tree 560. Based on the DOM tree portion provided in Box 562, a determination is made that the file attachment 556 has a .docx file extension. Determination that a Microsoft Word application is needed to open the attachment 556 may be made by the local browser. Alternatively, the file type may be reported to the session broker 234 which then makes the determination that a Microsoft Word application is needed to open the attachment 556.

The local browser may be an unmanaged browser or a managed browser 222. The unmanaged browser may be referred to as a native browser, and the managed browser 222 may be referred to as an embedded browser. The managed browser 222 is embedded within the workspace app 70, as discussed above.

Example unmanaged browsers include Chrome developed by Google, Firefox developed by Mozilla, and Edge developed by Microsoft. The source code for an unmanaged browser is a closed source software framework and cannot be modified. To implement monitoring and analyzing of unread emails with attachments using the unmanaged browser, a browser plug-in or extension can be used. A browser plug-in is a set of software components that can be added to the unmanaged browser to increase its capabilities.

With the managed browser 222, the source code can be modified. An example managed browser is Chromium. The Chromium browser is embedded within another application, such as the workspace app 70. The Chromium embedded browser enables developers to add web browsing functionality to their application, as well as the ability to use HTML, CSS, and JavaScript to create the application's user interface. In this case, the source code for the managed browser 222 is modified to monitor and analyze unread emails with attachments.

Additional techniques may be used to monitor and analyze unread emails with attachments. For example, user interface (UI) automation or computer vision may be used. UI automation is an application programming interface that allows one to access, identify, and manipulate the user interface elements of another application. UI automation and computer vision are limited to what is visible on the display 212.

Figure 10:
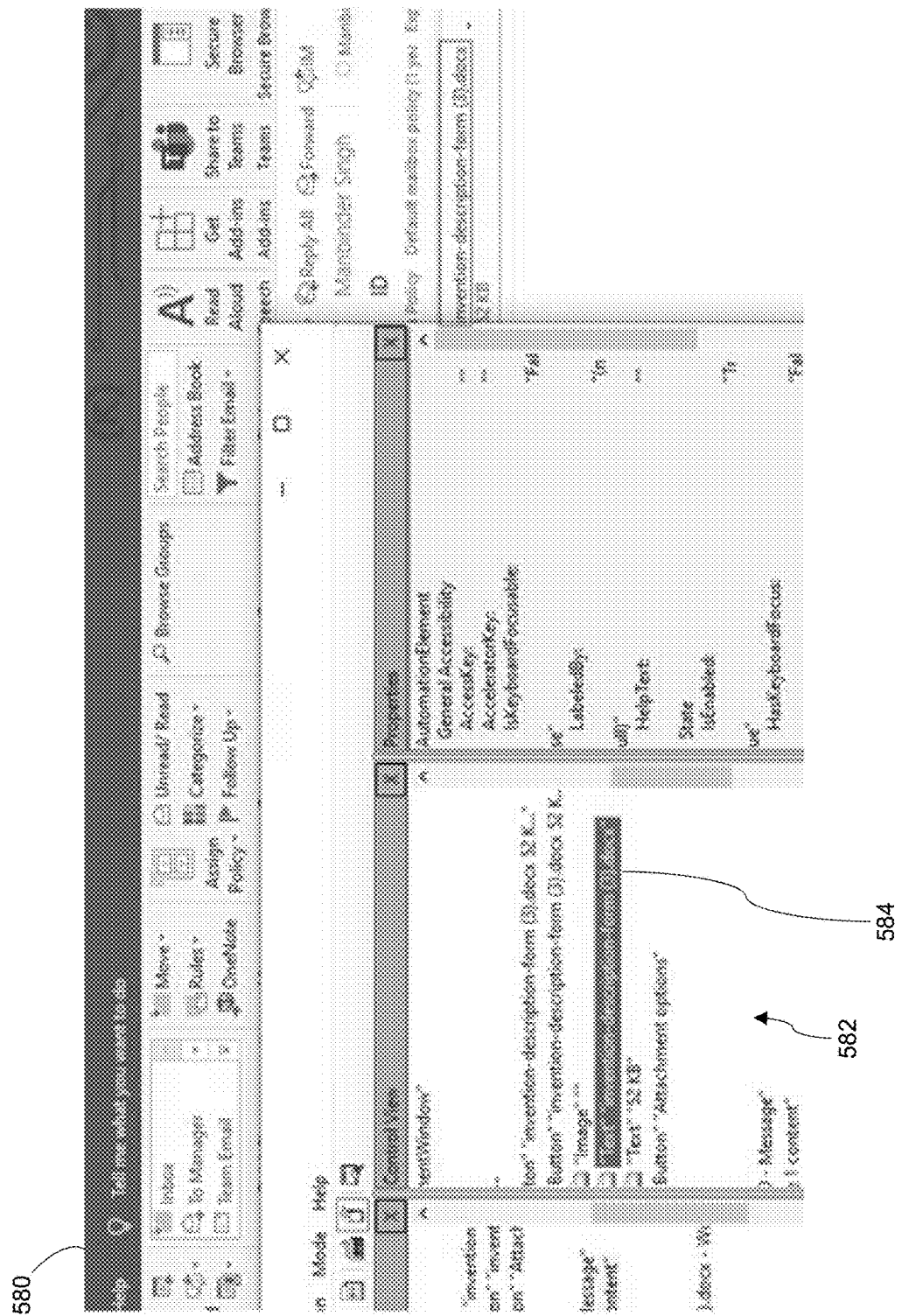
FIG. 10 is a screenshot of a windows-based email application with user interface (UI) automation being used to identify file attachment types within the emails for the computing system illustrated in FIG. 6.

As an illustrative example using UI automation, reference is directed to the screen shot 580 shown in FIG. 10. In the control view section 582, the file extension of an attachment is highlighted in box 584. A determination is made that the file attachment has a .docx file extension.

The identification of the file type is provided to the session broker 234. As discussed above, the file type identification may be performed where the email application is opened. The email application may be opened on the client computing device 210 as discussed above. Alternatively, the email application may be opened using a secure remote browser within a remote desktop in a virtual session. In this case, this involves the identification being performed within a virtual session. In the above example, the identified file type for attachment 556 is a .docx file extension.

The identification of the file type is provided to the session broker 234. The session broker 234 identifies the applications for the identified file types that can open the respective attachments 220. In the above example, the identified application for the .docx file extension for attachment 456 is Microsoft Word.

The session broker 234 identifies the resources at the virtual server 250 to be used to open the attachment. More particularly, the resources are selected from the available virtual delivery appliances 252.

The identified applications that can open the attachments are launched using the identified resources at Block 416 in response to receiving a prelaunch application message 236 from the session broker 234. For attachment 556, the application needed to open the .docx file extension may be prelaunched in a session 256 (e.g., ICA session) already established with the client computing device 210. This corresponds to prelaunched application 258. Alternatively, the application needed to open the .docx file extension may be prelaunched in a prelaunch session 260.

A prelaunch session 260 is not an ICA session since the client computing is not accessing the virtual delivery appliance 252(2) with the prelaunched application 262. A prelaunch session 260 becomes an ICA session when the user of the client computing device 210 opens the attachment 554. The prelaunch may be an anonymous prelaunch session or assigned to the user of the client computing device 210, as discussed above. The prelaunched apps 258, 262 are not shown to the user.

At Block 418 the user opens one of the file attachments 220. The client computing device 210 receives a session file 224 (e.g., ICA file) from the session broker 234 at Block 420 in order to access the session 256 with the prelaunched application 258. The prelaunched application 258 is then shown to the user. The user connects to the session 256 at Block 422 with the application already running. The user accesses the attachment 220 with the prelaunched application 258 at Block 424. The method ends at Block 426.

Figure 11:
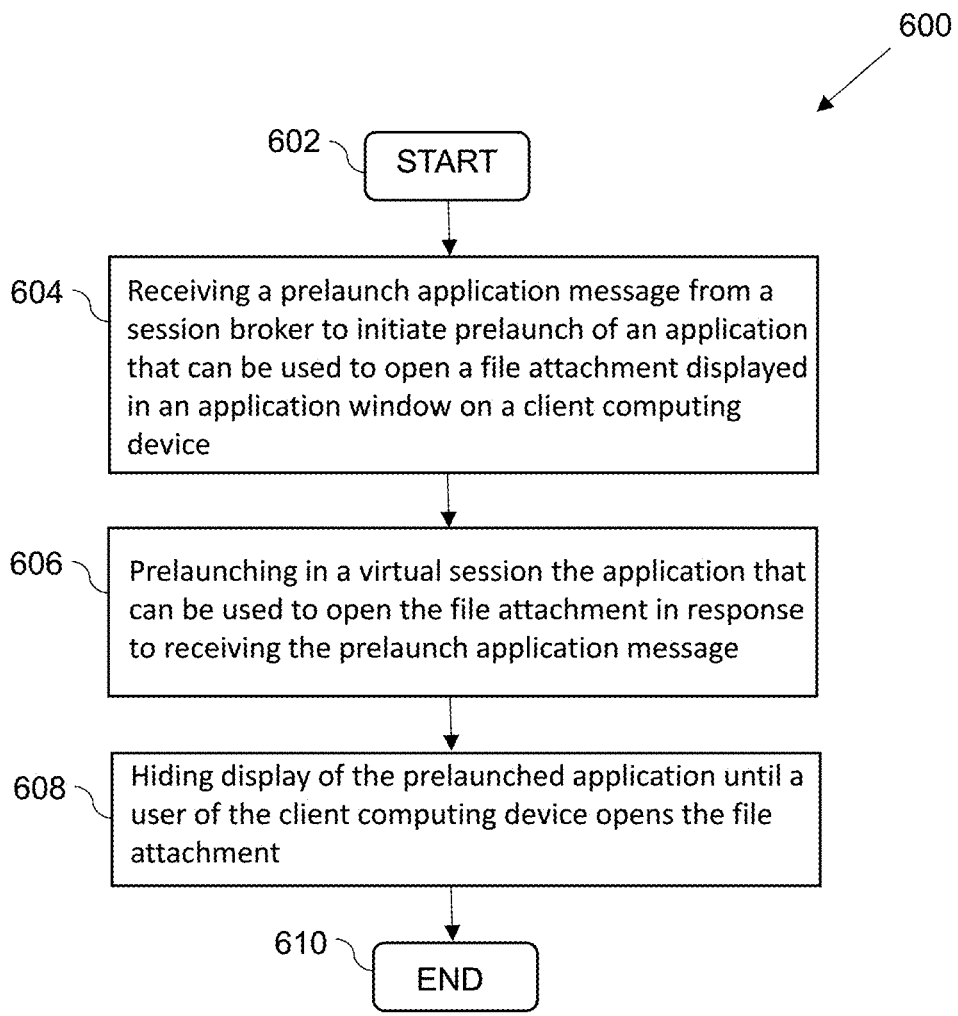
FIG. 11 is a flow diagram for operating the virtual server illustrated in FIG. 6.

Referring now to FIG. 11, a flow diagram 600 for operating the virtual server 250 will be discussed. From the start (Block 602), a prelaunch application message 236 is received from a session broker 234 at Block 604 to initiate prelaunch of an application that can be used to open a file attachment 220 displayed in an application window 216 on a client computing device 210. The virtual server 250 prelaunches in a virtual session 256 the application 258 that can be used to open the file attachment 220 in response to receiving the prelaunch application message 236 in Block 606. Display of the prelaunched application 258 is hidden at Block 608 until a user of the client computing device 210 opens the file attachment 220. The method ends at Block 610.

Furthermore, other aspects of the virtual server 250 may take the form of a computer program product stored by one or more computer-readable storage media having computer-readable program code, or instructions, embodied in or on the storage media, for operation thereof. Any suitable computer readable storage media may be utilized, including hard disks, CD-ROMs, optical storage devices, magnetic storage devices, and/or any combination thereof.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. A computing system comprising:
   a client computing device configured to display items in an application window, with at least one of the items having a file attachment that has not been opened by a user of said client computing device;

a session broker in communications with said client computing device and configured to transmit a prelaunch application message to a first virtual computing session selected from a plurality of virtual computing sessions, to initiate prelaunch of an application that can be used to open the file attachment; and a virtual server, configured to host the plurality of virtual computing sessions, in communications with said session broker and said client computing device and configured to perform the following:

prelaunch, in the first virtual computing session, the application that can be used to open the file attachment in response to receiving the prelaunch application message, and hide display of the prelaunched application until the user opens the file attachment.

2. The computing system according to claim 1 wherein in response to the user not opening the file attachment within a set time period, said virtual server closes the prelaunched application.

3. The computing system according to claim 1 wherein said client computing device launches an application providing the application window, and wherein the application is an email application or a messaging application, and the items being displayed are emails or messages.

4. The computing system according to claim 1 wherein the virtual session with the prelaunched application is an established virtual session already being accessed by said client computing device, and wherein the virtual server is further configured to display the prelaunched application from within the first virtual computing session on a user interface, based on identifying an available file attachment and the virtual session confirming that the client computing device has been authorized to access the file attachment.

5. The computing system according to claim 1 wherein the virtual session with the prelaunched application is a prelaunch session that is not being accessed by said client computing device.

6. The computing system according to claim 5 wherein the prelaunch session is an anonymous prelaunch session that is not assigned to the user but will be assigned to the user in response to the user opening the file attachment, and if the user does not open the file attachment, then the anonymous prelaunch session is assigned to a different user of another client computing device.

7. The computing system according to claim 1 wherein said client computing device is further configured to perform the following:

monitor unread items for file attachments;
identify the file attachment that has not been opened by the user for one of the unread items; and
determine a file type of the identified file attachment.

8. The computing system according to claim 7 wherein determining the file type is based on at least one of a name of the file attachment, a file extension of the file attachment, and an icon representing the file attachment.

9. The computing system according to claim 8 wherein the determining is performed using at least one of the following:

analyzing a document object model (DOM) tree of the file attachment;
monitoring user interface (UI) elements displayed in the application window; and
analyzing the displayed application window using computer vision.

10. The computing system according to claim 7 wherein said client computing device further transmits the determined file type to said session broker; and wherein said session broker determines which application is to be prelaunched based on the determined file type.

11. The computing system according to claim 7 wherein said client computing device further determines what application is needed to open the file attachment based on the determined file type, and transmits the determined application to said session broker to be prelaunched.

12. The computing system according to claim 7 wherein said client computing device launches an application providing the application window, and wherein the application is configured to perform the monitoring, identifying and determining.

13. The computing system according to claim 7 wherein said client computing device comprises a local browser to launch a web-based application providing the application window, and wherein the local browser is configured to perform the monitoring, identifying and determining.

14. A method comprising:

displaying items in an application window on a client computing device, with at least one of the items having a file attachment that has not been opened by a user of the client computing device;

operating a session broker in communications with the client computing device to transmit a prelaunch application message to a first virtual computing session selected from a plurality of virtual computing sessions, to initiate prelaunch of an application that can be used to open the file attachment; and operating a virtual server, configured to host the plurality of virtual computing sessions, in communications with the session broker and the client computing device to perform the following:

prelaunching, in the first virtual computing session, the application that can be used to open the file attachment in response to receiving the prelaunch application message, and hiding display of the prelaunched application until the user opens the file attachment.

15. The method according to claim 14 wherein in response to the user not opening the file attachment within a set time period, closing the prelaunched application.

16. The method according to claim 14 wherein the virtual session with the prelaunched application is a prelaunch session that is not being accessed by the client computing device.

17. The method according to claim 16 wherein the prelaunch session is an anonymous prelaunch session that is not assigned to the user but will be assigned to the user in response to the user opening the file attachment, and if the user does not open the file attachment, then the anonymous prelaunch session is assigned to a different user of another client computing device.

18. The method according to claim 14 further comprising operating the client computing device to perform the following:

monitoring unread items for file attachments;
identifying the file attachment that has not been opened by the user for one of the unread items; and
determining a file type of the identified file attachment.

19. The method according to claim 18 wherein determining the file type is based on at least one of a name of the file attachment, a file extension of the file attachment, and an icon representing the file attachment.

20. A virtual server comprising:
a processor configured to perform the following:
receiving a prelaunch application message from a session broker to initiate prelaunch of an application, to a first virtual computing session selected from a plurality of virtual computing sessions, that can be used to open a file attachment displayed in an application window on a client computing device;
wherein a virtual server is configured to host the plurality of virtual computing sessions,
prelaunching, in the first virtual computing session, the application that can be used to open the file attachment in response to receiving the prelaunch application message, and
hiding display of the prelaunched application until a user of the client computing device opens the file attachment.

21. The virtual server according to claim 20 wherein the virtual session with the prelaunched application is an established virtual session already being accessed by the client computing device.

22. The virtual server according to claim 20 wherein the virtual session with the prelaunched application is a prelaunch session that is not being accessed by the client computing device.

23. The virtual server according to claim 22 wherein the prelaunch session is an anonymous prelaunch session that is not assigned to the user but will be assigned to the user in response to the user opening the file attachment, and if the user does not open the file attachment, then the anonymous prelaunch session is assigned to a different user of another client computing device.

* * * * *